US005453746A

United States Patent [19]

Morand

[11] Patent Number: 5,453,746

[45] Date of Patent: Sep. 26, 1995

[54] ASSEMBLY INCLUDING A JETTISONABLE DEVICE WITH A TRAVELLING-WAVE TUBE

[75] Inventor: Jean Morand, Paris, France

[73] Assignee: Dassault Electronique, Saint Cloud, France

[21] Appl. No.: 183,983

[22] Filed: Jan. 18, 1994

[30] Foreign Application Priority Data

Feb. 26, 1993 [FR] France .................................. 93 02268

[51] Int. Cl.[6] ................................ G01S 7/36; G01S 7/42

[52] U.S. Cl. ................................ 342/14; 455/98; 89/1.51; 89/1.11

[58] Field of Search ................................ 342/14; 455/98; 89/1.51, 1.11

[56] References Cited

U.S. PATENT DOCUMENTS

| | | | |
|---|---|---|---|
| 3,038,154 | 5/1962 | Zworykin et al. | 342/14 |
| 3,689,842 | 9/1972 | Meed | 342/14 |
| 4,858,530 | 8/1989 | Edminister et al. | 102/208 |
| 5,192,827 | 3/1993 | Jasper, Jr. | 342/14 |

FOREIGN PATENT DOCUMENTS

0450999A1 9/1991 European Pat. Off..

*Primary Examiner*—J. Woodrow Eldred
*Attorney, Agent, or Firm*—Christie, Parker & Hale

[57] ABSTRACT

A jettisonable means comprises means with a travelling-wave tube for emitting electromagnetic waves. It forms part of an assembly having external power supply means for supplying the filament of the travelling-wave tube. The external power supply means temporarily supplies the filament of the travelling-wave tube to heat it to its nominal temperature before jettisoning, whilst, at the moment of jettisoning, the external power supply means are disconnected. This enables a temperature appropriate to the operation of the travelling-wave tube to be provided temporarily, after the jettisoning.

11 Claims, 4 Drawing Sheets

ASSEMBLY INCLUDING A JETTISONABLE DEVICE WITH A TRAVELLING-WAVE TUBE

BACKGROUND OF THE INVENTION

The invention concerns a jettisonable device comprising means with a travelling-wave tube for emitting electromagnetic waves.

Generally, given that during the jetison stage, the jettisonable device is no longer connected to the carrier, an internal power supply device of the cell or battery type is generally provided, able to supply the very high voltage of the travelling-wave tube after jettisoning.

However, the cell or battery is triggered just after jettisoning.

This means that the cell, which is generally of the thermal cell type, is not immediately operational. It takes a few fractions of a second for its potential energy to become available, which jeopardises proportionally the efficacy of the electromagnetic wave emission.

A known solution consists of using travelling-wave tubes with a rapid-heating cathode, taking less than one second to heat, but this has the drawback of being very costly, which is incompatible with consumable objects.

SUMMARY OF THE INVENTION

The invention provides a solution to the above mentioned problem.

It concerns an assembly including a jettisonable device, comprising:

- jettisonable means with a travelling-wave tube for emitting electromagnetic waves and
- external power supply means able to supply the filament of the travelling-wave tube, the arrangement being such that, before jettisoning of the jettisonable means, the said external power supply means temporarily supply the filament of the travelling-wave tube to heat it to its nominal temperature, whilst at the moment of jettisoning, the said external power supply means are disconnected, which enables a temperature appropriate to the operation of the travelling-wave tube to be provided temporarily, after the jettisoning.

Such a device is contrary to the normal conventional techniques according to which it is sought to reduce the thermal inertia of the cathodes of the travelling-wave tubes.

In contrast, in the present invention, it is appropriate to choose a travelling-wave tube having high thermal inertia for the optimum implementation of the invention.

Thus the external power supply means may supply the filament of the travelling-wave tube before the jettisonable means is permanently or temporarily jettisoned for a period of around a few minutes, for example three minutes, until the cathode of the travelling-wave tube reaches its equilibrium point.

At the moment of jettisoning, the power supply means are disconnected and the cathode cools slowly and remains temporarily within a temperature range which is acceptable to ensure the current flow necessary for the correct functioning of the travelling-wave tube.

In a first embodiment of the device according to the invention, the external power supply means comprise a voltage source with a high chopping frequency whereas the filament has electrical characteristics appropriate for such a voltage source.

Advantageously, in order to avoid connecting the very high voltage applied to the cathode of the travelling-wave tube to the supply terminals of the filament, the device also comprises a transformer, the primary of which is connected to the voltage source and the secondary of which is connected to the filament of the travelling-wave tube.

In another embodiment of the device according to the invention, when periods of operation are required which may for example be greater than 10 seconds, or even a few minutes, supplementary internal power supply means are also provided which are able to supply the filament after jettisoning, the said supplementary internal power supply means being connected to internal power supply means for the travelling-wave tube on the one hand and to the primary or secondary of a transformer on the other hand.

In a particular application of the invention, the jettisonable means is a jettisonable decoy comprising means appropriate for active electromagnetic decoying with a travelling-wave tube.

Other characteristics and advantages of the invention will emerge from the following detailed description and the drawings.

DETAILED DESCRIPTION OF PREFERRED EMBODIMENTS

Figure 1:
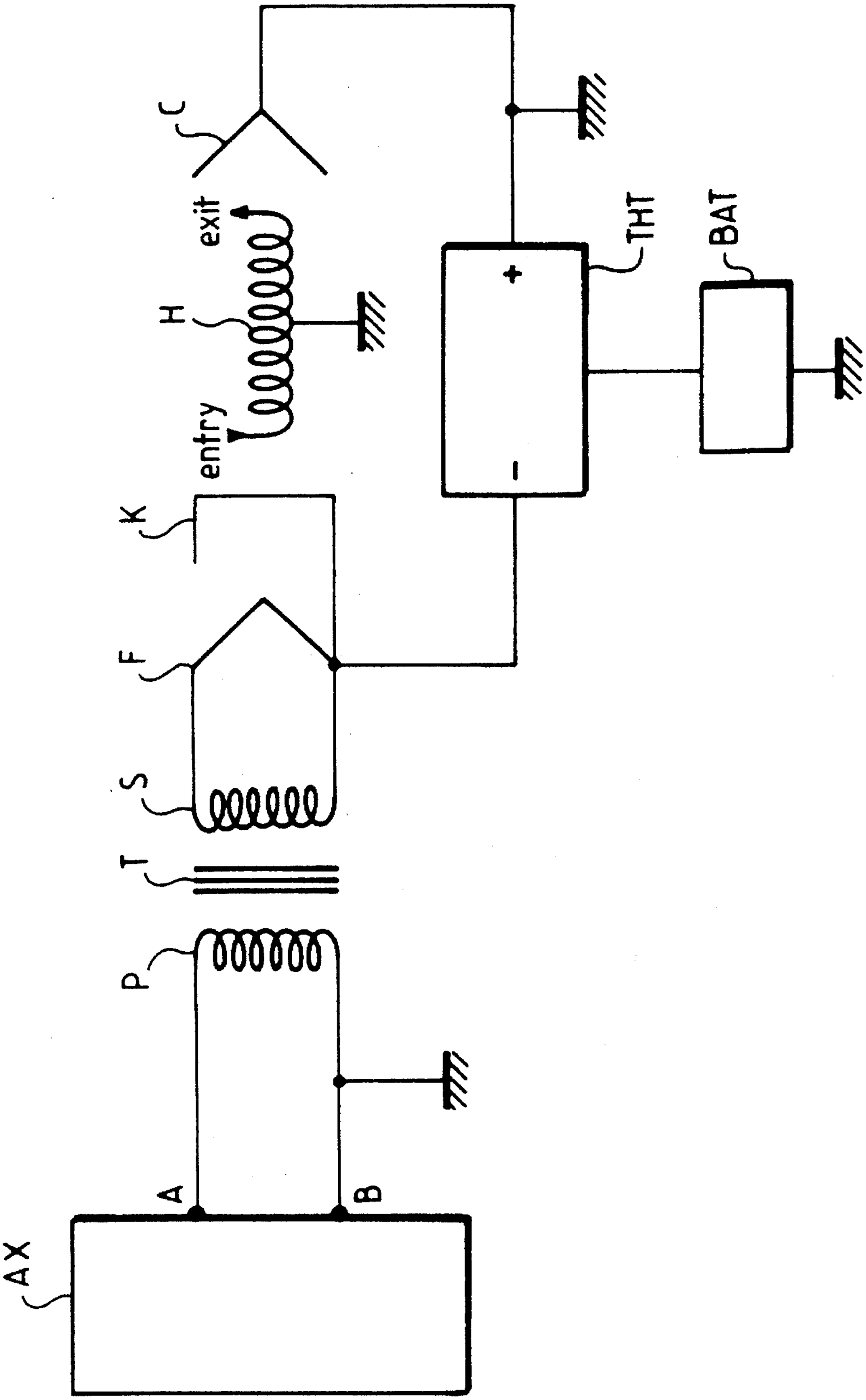
FIG. 1 shows diagrammatically a travelling-wave tube with a collector, for example one that is not depressed, according to the invention.

As described with reference to FIG. 1, a travelling-wave tube comprises a cathode K and a collector C.

The cathode K is heated by a filament F, one end of which is connected to the cathode K.

The electrons emitted by the cathode K are collected by the collector C.

Interposed between the cathode K and the collector C, a helix H is provided which is disposed in the form of a coil around the path of the electrons from the cathode K to the collector C. For example, the helix H is connected to the means of emission/reception of the electromagnetic decoying (not shown) of a decoy where the jettisonable device is for example a decoy.

An extra-high tension source THT supplies the travelling-wave tube between these electrodes K and C.

Given that during the jetison stage, the jettisonable device, for example the decoy, is no longer connected to the carrier, an internal power supply device BAT of the cell or battery type is generally provided which is able to supply the extra-high tension source THT of the travelling-wave tube after jettisoning.

As described with reference to FIG. 1, the battery or cell BAT supplies the extra-high tension source THT.

However, the cell or battery BAT is generally triggered just after jetison.

The result of this is that the cell is not yet operational for a few fractions of a second, which jeopardises proportionally the efficacy of the electromagnetic decoying for example, because it is at the moment of physical separation between the decoy and the carrier to be protected that the decoying stage is most critical.

According to the invention, the device also comprises external power supply means AX able to supply the filament F of the travelling-wave tube, the said external power supply means AX temporarily supplying the filament of the travelling-wave tube to heat it to its nominal temperature, whilst at the moment of jettisoning, the said external power supply means AX are disconnected, which enables a temperature appropriate to the operation of the travelling-wave tube to be temporarily ensured after the jettisoning of the device.

Figure 2:
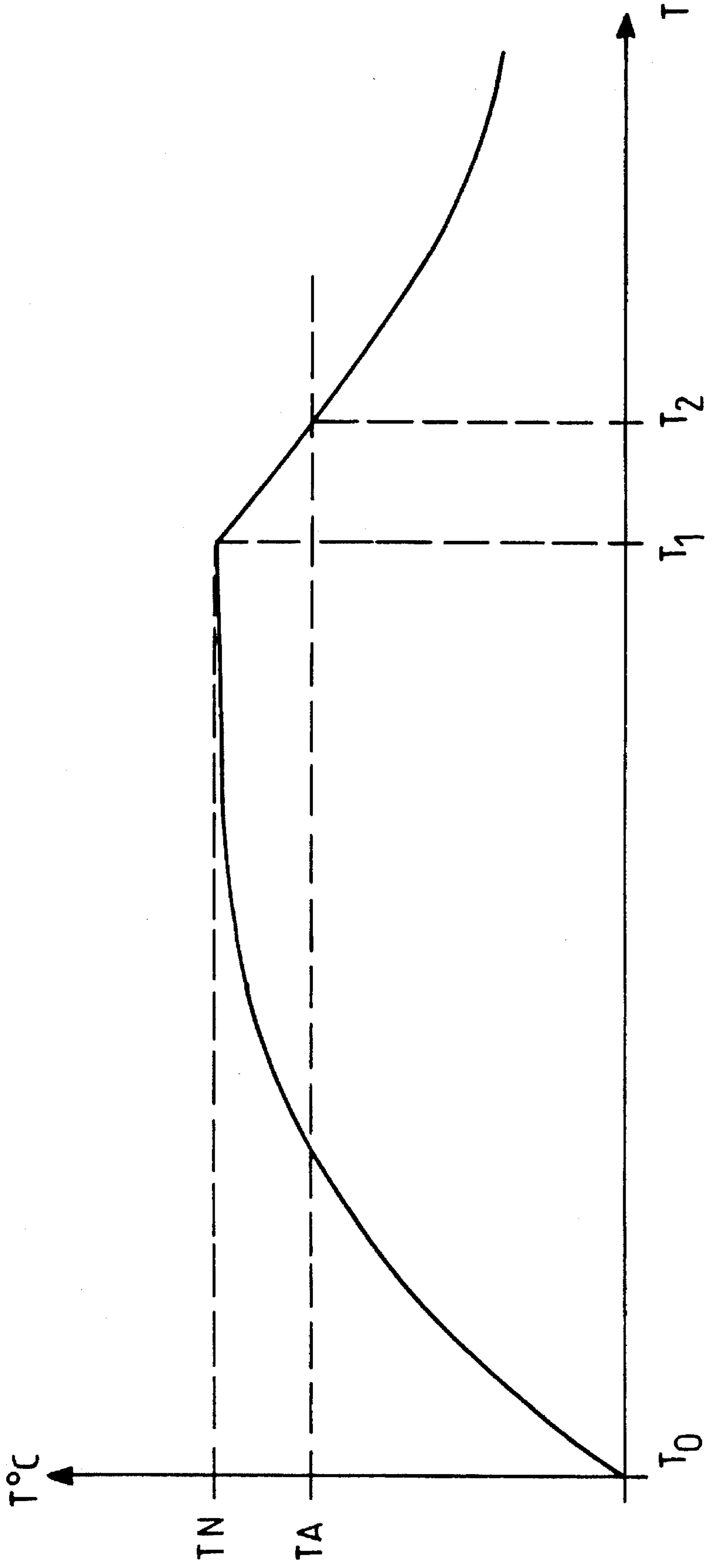
FIG. 2 is a diagram illustrating the operating temperature of the travelling-wave tube of FIG. 1 as a function of time.

As shown in the diagram with reference to FIG. 2, from time T0, the filament F of the travelling-wave tube is heated by the external power supply means AX.

The temperature of the filament F increases up to a nominal temperature TN.

At time T1, the external power supply means AX are disconnected and the heating of the filament is consequently stopped.

At time T2, the temperature of the filament drops below the value TA, which corresponds to the current flow necessary to supply the travelling-wave tube.

Thus, during the stage of heating the filament occurring from T0 to T1, the temperature of the filament increases to TN whereas, during the cooling stage occurring from T1 to T2, the filament changes from temperature TN to TA.

The invention consists of using the period between T1 and T2 for the cathode to remain temporarily within an acceptable temperature range able to provide the current flow necessary for the correct operation of the travelling-wave tube. This cooling stage during the period between T1 and T2 is selected so as to be as long as possible to achieve optimum functioning of the invention.

Thus, the external power supply means AX supply the filament of the travelling-wave tube before the permanent or temporary jettisoning of the device for a period T0 to T1, of around a few minutes, for example three minutes, until the cathode of the travelling-wave tube progressively reaches its equilibrium point TN. It can also be continuously heated, its life when heated now being up to 40,000 hours without difficulty.

At the moment of jettisoning, the power supply means AX are disconnected and the cathode cools slowly and remains temporarily, for example for 10 seconds, within a temperature range (>=TA) which is acceptable to ensure the current flow necessary for the correct operation of the travelling-wave tube.

The invention therefore is contrary to the normal conventional techniques in which it is sought to reduce the thermal inertia of the travelling-wave tube.

In contrast, in the present invention, it is appropriate to choose a travelling-wave tube having high thermal inertia.

Advantageously in order to ensure that the extra-high tension THT applied to the cathode of the travelling-wave tube is not connected to the terminals A and B for the external power supply of the filament, a transformer TF is provided in addition, on which the primary P1 is connected to the voltage source AX and the secondary S1 is connected to the filament F.

Such an isolating transformer TF enables the possibility of a flashover between the extra-high tension THT and the body of the decoy to be avoided when the latter is launched at a high altitude where the dielectric strength of the air is low.

Advantageously, to reduce the size of the transformer TF, an external voltage supply AX with a high chopping frequency is chosen.

The filament F of the travelling-wave tube is consequently designed so as to operate at the highest possible frequency.

Under these conditions, the self-inductance of the connections and of the filament is as low as possible.

If longer operating periods are desired, provision is also made according to the invention for using a supplementary internal power supply to the jettisonable device when the period of time T2 to T1 is sufficiently long for it to be utilized.

Figure 3:
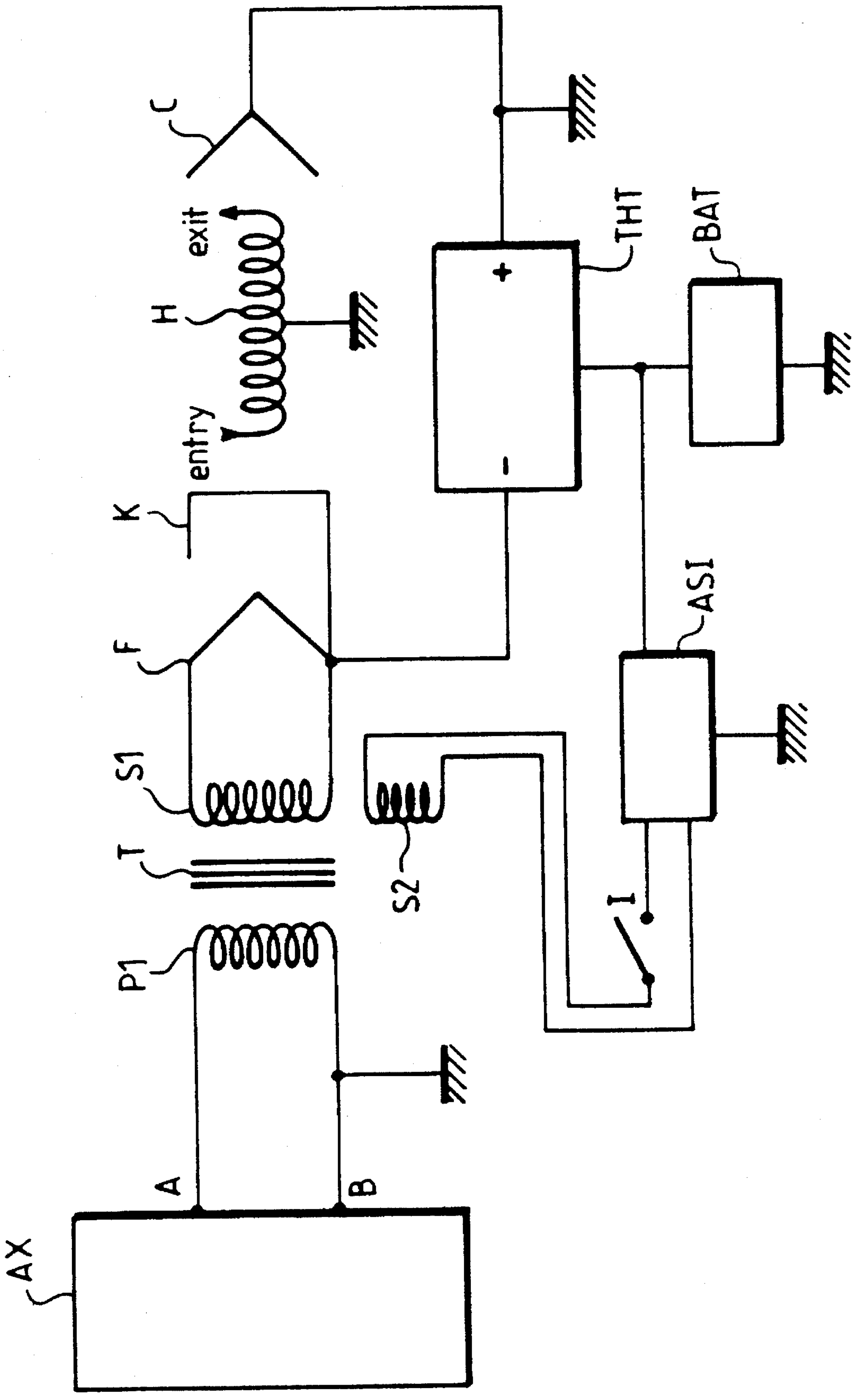
FIG. 3 shows diagrammatically a travelling-wave tube equipped with supplementary internal power supply means according to the invention.

With reference to FIG. 3, an embodiment of the said supplementary internal power supply means is shown.

For example, the supplementary internal power supply means ASI are connected on the one hand to the battery BAT and on the other hand to a secondary winding S2 of the transformer TF, isolated for the extra-high tension.

A switch I is supplied between the secondary winding S2 and a supply terminal of the supplementary internal power supply means ASI. This switch is closed to supply the said secondary winding S2 coupled to the secondary winding S1 when the decoy is jettisoned.

Before jettisoning, only the windings P1 and S1 are operating, because the switch I is open on the circuit S2.

Figure 4:
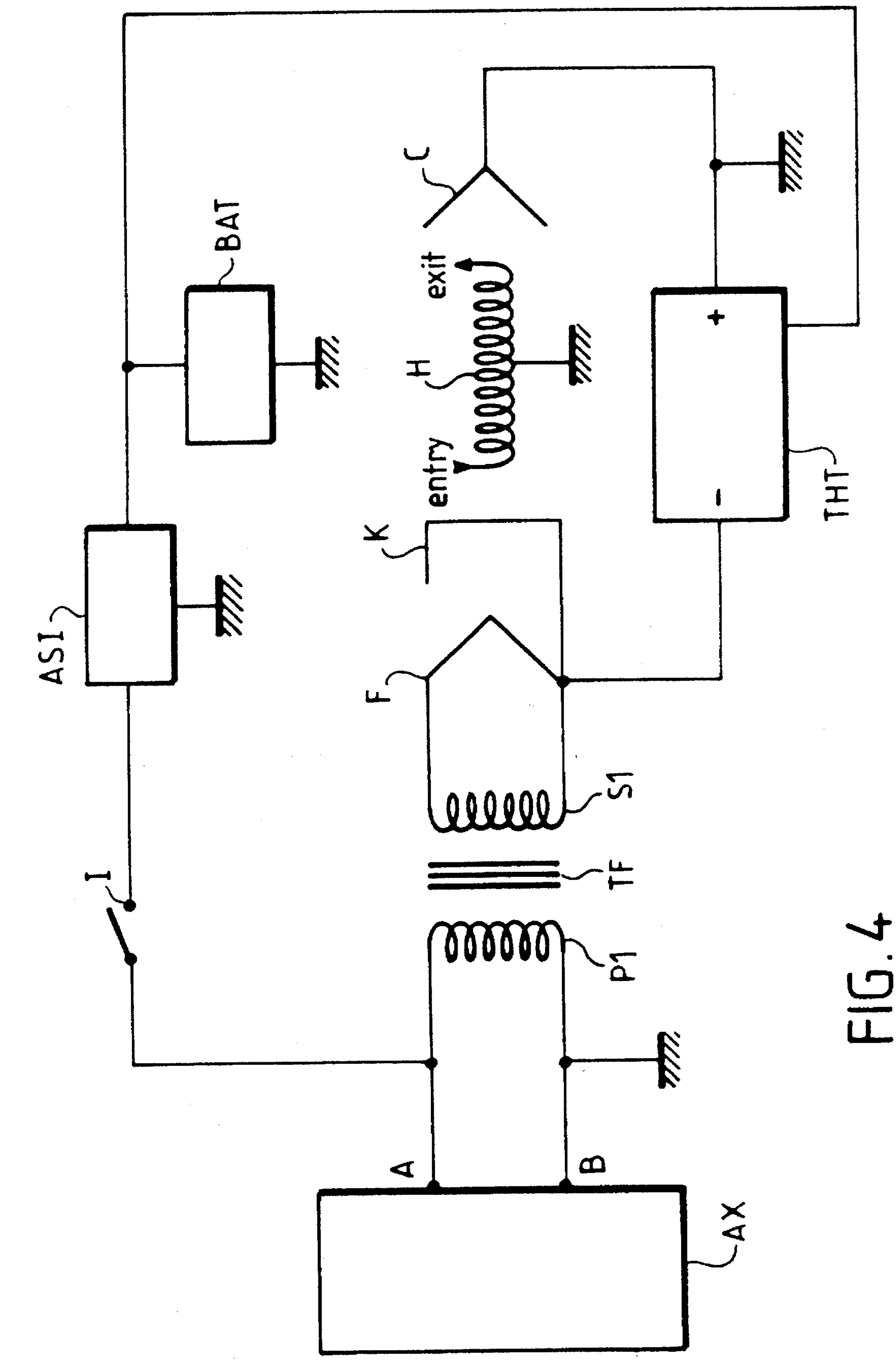
FIG. 4 is another diagrammatic representation of the travelling-wave tube equipped with supplementary internal power supply means according to the invention.

As a variant (FIG. 4) the supplementary internal power supply ASI is connected on the one hand to the cell BAT and on the other hand to the primary winding P1 through a switch I, controllable as in FIG. 3.

In another variant, the cell BAT intended to supply the source THT may be adequate to supply the filament F.

A person skilled in the art will understand that the device according to the invention enables a temperature appropriate to the operation of the travelling-wave tube to be provided temporarily after the jettisoning of the jettisonable device.

This solution is contrary to the normal techniques.

It has the advantage of being simple and economical.

It is applicable to all equivalent jettisonable systems comprising means for emitting electromagnetic waves with a travelling-wave tube which require a very rapid reaction time when used.

I claim:

1. An assembly including a jettisonable device comprising:

a jettisonable means with a travelling-wave tube for emitting electromagnetic waves, the travelling-wave tube including an electrically heated filament;

an associated external power supply means for temporarily supplying current to the filament of the travelling-wave tube for heating the filament to its nominal operating temperature before jettisoning, wherein upon jettisoning the device, the external power supply means are disconnected from the filament; and means for temporarily maintaining a sufficient filament temperature for correct functioning of the travelling-wave tube after the device is jettisoned.

2. An assembly according to claim 1 wherein the travelling-wave tube is chosen so as to have sufficient thermal inertia for operation of the travelling-wave tube after jettisoning.

3. An assembly according to claim 1 wherein the external power supply means comprise a voltage source with a high chopping frequency, whilst the filament has sufficiently low self-inductance for such a voltage source.

4. An assembly according to claim 3, which further comprises a transformer, the primary of which is connected to the voltage source, and the secondary to the filament.

5. An assembly according to claim 4, wherein said jettisonable means includes supplementary internal power supply means which are able to supply the filament after the jettisoning of the said jettisonable means, the said supplementary internal power supply means being connected to internal power supply means for the travelling-wave tube on the one hand and to the primary or secondary of the transformer on the other hand.

6. An assembly according to claim 1, wherein said jettisonable means is a jettisonable decoy comprising means appropriate for active electromagnetic decoying with a travelling-wave tube.

7. An assembly according to claim 3, wherein the travelling-wave tube is chosen so as to have sufficient thermal inertia for operation of the travelling-wave tube after jettisoning.

8. An assembly according to claim 3, wherein said jettisonable means is a jettisonable decoy comprising means appropriate for active electromagnetic decoying with said travelling-wave tube.

9. A decoy assembly comprising:

a jettisonable decoy with a travelling-wave tube for emitting electromagnetic waves, the travelling-wave tube including an electrically heated filament;

an associated external power supply for temporarily supplying current to the filament of the travelling-wave tube for, before jettisoning, heating the filament to a temperature above the minimum functioning temperature for the travelling-wave tube, wherein upon jettisoning the decoy, the external power supply means are disconnected from the filament; and wherein the filament has sufficient thermal inertia for temporarily maintaining a sufficient filament temperature for correct functioning of the travelling-wave tube for a few seconds after the decoy is jettisoned.

10. A decoy assembly as recited in claim 9 further comprising an internal power supply on the decoy for electrically heating the filament after jettisoning and before the temperature of the filament decreases below the minimum functioning temperature for the travelling-wave tube.

11. A decoy assembly as recited in claim 9 wherein the external power supply has a high chopping frequency and the filament has a sufficiently low self-inductance for the high frequency.

* * * * *